US011036006B2

(12) United States Patent
Lerose et al.

(10) Patent No.: US 11,036,006 B2
(45) Date of Patent: Jun. 15, 2021

(54) WAVEGUIDE DEVICE AND METHOD OF DOPING A WAVEGUIDE DEVICE

(71) Applicant: ROCKLEY PHOTONICS LIMITED, London (GB)

(72) Inventors: Damiana Lerose, Pasadena, CA (US); Hooman Abediasl, Pasadena, CA (US); Amit Singh Nagra, Altadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/465,538

(22) PCT Filed: Dec. 1, 2017

(86) PCT No.: PCT/EP2017/081215
§ 371 (c)(1),
(2) Date: May 30, 2019

(87) PCT Pub. No.: WO2018/100172
PCT Pub. Date: Jun. 7, 2018

(65) Prior Publication Data
US 2019/0331855 A1    Oct. 31, 2019

Related U.S. Application Data

(60) Provisional application No. 62/429,703, filed on Dec. 2, 2016.

(51) Int. Cl.
*G02B 6/14* (2006.01)
*G02B 6/122* (2006.01)
(Continued)

(52) U.S. Cl.
CPC ........... *G02B 6/1347* (2013.01); *G02B 6/122* (2013.01); *G02F 1/025* (2013.01); *G02B 2006/12097* (2013.01); *G02F 2201/063* (2013.01)

(58) Field of Classification Search
CPC .............................. G02B 6/1347; G02B 6/122
(Continued)

(56) References Cited

U.S. PATENT DOCUMENTS 4,093,345 A    6/1978  Logan et al.
4,720,468 A    1/1988  Menigaux et al.
(Continued)

FOREIGN PATENT DOCUMENTS

CN    101529306 A    9/2009
CN    101868745 A    10/2010
(Continued)

OTHER PUBLICATIONS

Feng, Dazeng et al., "High-Speed GeSi Electroabsorption Modulator on the SOI Waveguide Platform", IEEE Journal of Selected Topics in Quantum Electronics, Nov./Dec. 2013, 10 pages, vol. 19, No. 6, IEEE.
(Continued)

*Primary Examiner* — Kaveh C Kianni
(74) *Attorney, Agent, or Firm* — Lewis Roca Rothgerber Christie LLP

(57) ABSTRACT

A waveguide device and method of doping a waveguide device, the waveguide device comprising a rib waveguide region, the rib waveguide region having: a base, and a ridge extending from the base, wherein: the base includes a first slab region at a first side of the ridge and a second slab region at a second side of the ridge; a first doped slab region extends along the first slab region; a second doped slab region extends along the second slab region; a first doped sidewall region extends along a first sidewall of the ridge and along a portion of the first slab, the first doped sidewall region being in contact with the first doped slab region at a first slab interface; and a second doped sidewall region extends along a second sidewall of the ridge and along a
(Continued)

portion of the second slab, the second doped sidewall region being in contact with the second doped slab region at a second slab interface; and wherein the separation between the first sidewall of the ridge and the first slab interface is no more than 10 μm; and wherein the separation between the second sidewall of the ridge and the second slab interface is no more than 10 μm.

20 Claims, 7 Drawing Sheets

(51) Int. Cl.
  *G02F 1/025* (2006.01)
  *G02B 6/134* (2006.01)
  *G02B 6/12* (2006.01)

(58) Field of Classification Search
  USPC .......................................................... 385/14
  See application file for complete search history.

(56) References Cited

U.S. PATENT DOCUMENTS

| | | | |
|---|---|---|---|
| 4,739,287 A | 4/1988 | Staupendahl et al. | |
| 4,943,133 A | 7/1990 | Deri et al. | |
| 5,237,639 A * | 8/1993 | Kato | G02B 6/131 257/E27.12 |
| 5,438,444 A | 8/1995 | Tayonaka et al. | |
| 5,446,751 A | 8/1995 | Wake | |
| 5,511,088 A | 4/1996 | Loualiche et al. | |
| 5,524,076 A | 6/1996 | Rolland et al. | |
| 5,559,624 A | 9/1996 | Darcie et al. | |
| 5,581,396 A | 12/1996 | Kubota et al. | |
| 5,715,076 A | 2/1998 | Alexander et al. | |
| 5,726,784 A | 3/1998 | Alexander et al. | |
| 5,757,986 A | 5/1998 | Crampton et al. | |
| 5,784,184 A | 7/1998 | Alexander et al. | |
| 5,861,966 A | 1/1999 | Ortel | |
| 5,908,305 A | 6/1999 | Crampton et al. | |
| 5,917,642 A | 6/1999 | O'Donnell et al. | |
| 5,999,300 A | 12/1999 | Davies et al. | |
| 6,229,189 B1 | 5/2001 | Yap et al. | |
| 6,233,077 B1 | 5/2001 | Alexander et al. | |
| 6,298,177 B1 | 10/2001 | House | |
| 6,349,106 B1 | 2/2002 | Coldren | |
| 6,396,801 B1 | 5/2002 | Upton et al. | |
| 6,445,839 B1 | 9/2002 | Miller | |
| 6,549,313 B1 | 4/2003 | Doerr et al. | |
| 6,563,627 B2 | 5/2003 | Yoo | |
| 6,580,739 B1 | 6/2003 | Coldren | |
| 6,584,239 B1 | 6/2003 | Dawnay et al. | |
| 6,597,824 B2 | 7/2003 | Newberg et al. | |
| 6,614,819 B1 | 9/2003 | Fish et al. | |
| 6,636,662 B1 | 10/2003 | Thompson et al. | |
| 6,678,479 B1 | 1/2004 | Naoe et al. | |
| 6,680,791 B2 | 1/2004 | Demir et al. | |
| 6,710,911 B2 | 3/2004 | LoCascio et al. | |
| 6,768,827 B2 | 7/2004 | Yoo | |
| 6,845,198 B2 | 1/2005 | Montgomery et al. | |
| 6,873,763 B2 | 3/2005 | Nikonov | |
| 7,031,617 B2 | 4/2006 | Zucchelli et al. | |
| 7,085,443 B1 | 8/2006 | Gunn, III et al. | |
| 7,092,609 B2 | 8/2006 | Yegnanarayanan et al. | |
| 7,133,576 B2 | 11/2006 | Coldren et al. | |
| 7,174,058 B2 | 2/2007 | Coldren et al. | |
| 7,180,148 B2 | 2/2007 | Morse | |
| 7,184,438 B2 | 2/2007 | Loge et al. | |
| 7,256,929 B1 | 8/2007 | Rong et al. | |
| 7,394,948 B1 | 7/2008 | Zheng et al. | |
| 7,397,101 B1 * | 7/2008 | Masini | H01L 31/028 257/184 |
| 7,418,166 B1 | 8/2008 | Kapur et al. | |
| 7,505,686 B2 | 3/2009 | Jennen | |
| 7,536,067 B2 | 5/2009 | Handelman | |
| 7,542,641 B1 * | 6/2009 | Asghari | G02B 6/12007 385/24 |
| 7,558,487 B2 | 7/2009 | Liu et al. | |
| 7,570,844 B2 | 8/2009 | Handelman | |
| 7,603,016 B1 * | 10/2009 | Soref | B82Y 20/00 385/129 |
| 7,747,122 B2 | 6/2010 | Shetrit et al. | |
| 7,811,844 B2 | 10/2010 | Carothers et al. | |
| 7,826,700 B2 | 11/2010 | Knights et al. | |
| 7,885,492 B2 | 2/2011 | Welch et al. | |
| 7,916,377 B2 | 3/2011 | Witzens et al. | |
| 7,920,790 B2 | 4/2011 | Toliver | |
| 7,941,014 B1 | 5/2011 | Watts et al. | |
| 8,053,790 B2 | 11/2011 | Feng et al. | |
| 8,073,029 B2 | 12/2011 | Hashimoto | |
| 8,093,080 B2 | 1/2012 | Liao et al. | |
| 8,160,404 B2 | 4/2012 | Pan et al. | |
| 8,242,432 B2 | 8/2012 | Feng et al. | |
| 8,346,028 B2 | 1/2013 | Feng et al. | |
| 8,362,494 B2 | 1/2013 | Lo et al. | |
| 8,401,385 B2 | 3/2013 | Spivey et al. | |
| 8,403,571 B2 | 3/2013 | Walker | |
| 8,410,566 B2 | 4/2013 | Qian et al. | |
| 8,411,260 B1 * | 4/2013 | Feng | G02B 6/12004 356/73.1 |
| 8,463,088 B1 * | 6/2013 | Asghari | H01S 5/4062 385/14 |
| 8,493,976 B2 | 7/2013 | Lin | |
| 8,693,811 B2 | 4/2014 | Morini et al. | |
| 8,724,988 B2 | 5/2014 | Andriolli et al. | |
| 8,737,772 B2 | 5/2014 | Dong et al. | |
| 8,774,625 B2 | 7/2014 | Binkert et al. | |
| 8,792,787 B1 | 7/2014 | Zhao et al. | |
| 8,817,354 B2 | 8/2014 | Feng et al. | |
| 8,842,946 B1 * | 9/2014 | Liao | G02B 6/136 385/14 |
| 8,942,559 B2 | 1/2015 | Binkert et al. | |
| 9,128,309 B1 | 9/2015 | Robertson | |
| 9,142,698 B1 | 9/2015 | Cunningham et al. | |
| 9,182,546 B2 | 11/2015 | Prosyk et al. | |
| 9,229,249 B2 | 1/2016 | Akiyama | |
| 9,279,936 B2 | 3/2016 | Qian et al. | |
| 9,282,384 B1 | 3/2016 | Graves | |
| 9,306,698 B2 | 4/2016 | Chen et al. | |
| 9,329,415 B2 | 5/2016 | Song et al. | |
| 9,411,177 B2 | 8/2016 | Cunningham et al. | |
| 9,438,970 B2 | 9/2016 | Jones et al. | |
| 9,448,425 B2 | 9/2016 | Ogawa et al. | |
| 9,513,498 B2 | 12/2016 | Jones et al. | |
| 9,541,775 B2 | 1/2017 | Ayazi et al. | |
| 9,548,811 B2 | 1/2017 | Kucharski et al. | |
| 9,575,337 B2 | 2/2017 | Adams et al. | |
| 9,668,037 B2 | 5/2017 | Jones et al. | |
| 9,733,542 B2 | 8/2017 | Bai | |
| 10,128,957 B2 | 11/2018 | Welch et al. | |
| 10,133,094 B1 | 11/2018 | Yu et al. | |
| 10,135,542 B2 | 11/2018 | Nagra et al. | |
| 10,185,203 B1 | 1/2019 | Yu et al. | |
| 10,191,350 B2 | 1/2019 | Yu et al. | |
| 10,216,059 B2 | 2/2019 | Yu et al. | |
| 10,222,677 B2 | 3/2019 | Yu et al. | |
| 10,231,038 B2 | 3/2019 | Rickman et al. | |
| 10,401,656 B2 | 9/2019 | Yu et al. | |
| 10,678,115 B2 | 6/2020 | Yu et al. | |
| 2001/0030787 A1 | 10/2001 | Tajima | |
| 2001/0040907 A1 | 11/2001 | Chakrabarti | |
| 2002/0048289 A1 | 4/2002 | Atanackovic et al. | |
| 2002/0102046 A1 | 8/2002 | Newberg et al. | |
| 2002/0154847 A1 | 10/2002 | Dutt et al. | |
| 2002/0159117 A1 | 10/2002 | Nakajima et al. | |
| 2002/0186453 A1 | 12/2002 | Yoo | |
| 2003/0031445 A1 | 2/2003 | Parhami et al. | |
| 2003/0063362 A1 | 4/2003 | Demir et al. | |
| 2003/0095737 A1 | 5/2003 | Welch et al. | |
| 2003/0133641 A1 | 7/2003 | Yoo | |
| 2003/0142943 A1 | 7/2003 | Yegnanarayanan et al. | |
| 2003/0156789 A1 | 8/2003 | Bhardwaj et al. | |
| 2003/0176075 A1 | 9/2003 | Khan et al. | |

(56) References Cited

U.S. PATENT DOCUMENTS

| | | |
|---|---|---|
| 2003/0223672 A1 | 12/2003 | Joyner et al. |
| 2004/0008395 A1 | 1/2004 | McBrien et al. |
| 2004/0013429 A1 | 1/2004 | Duelk et al. |
| 2004/0033004 A1 | 2/2004 | Welch et al. |
| 2004/0126057 A1 | 7/2004 | Yoo |
| 2004/0207016 A1 | 10/2004 | Patel et al. |
| 2004/0208454 A1 | 10/2004 | Montgomery et al. |
| 2004/0246557 A1 | 12/2004 | Lefevre et al. |
| 2004/0251468 A1* | 12/2004 | Mouli .............. H01L 27/14609 257/80 |
| 2005/0053377 A1 | 3/2005 | Yoo |
| 2005/0089269 A1 | 4/2005 | Cheng et al. |
| 2005/0089273 A1 | 4/2005 | Squires et al. |
| 2005/0286850 A1 | 12/2005 | German et al. |
| 2006/0140528 A1 | 6/2006 | Coldren et al. |
| 2006/0257065 A1 | 11/2006 | Coldren et al. |
| 2007/0065076 A1 | 3/2007 | Grek et al. |
| 2007/0104441 A1 | 5/2007 | Ahn et al. |
| 2007/0280309 A1 | 12/2007 | Liu |
| 2008/0013881 A1 | 1/2008 | Welch et al. |
| 2008/0095486 A1 | 4/2008 | Shastri et al. |
| 2008/0138088 A1 | 6/2008 | Welch et al. |
| 2009/0003841 A1 | 1/2009 | Ghidini et al. |
| 2009/0127645 A1* | 5/2009 | Knights ............. G02B 6/12004 257/432 |
| 2009/0169149 A1 | 7/2009 | Block |
| 2009/0185804 A1 | 7/2009 | Kai et al. |
| 2009/0245298 A1 | 10/2009 | Sysak et al. |
| 2010/0002994 A1 | 1/2010 | Baehr-Jones et al. |
| 2010/0060970 A1 | 3/2010 | Chen |
| 2010/0060972 A1 | 3/2010 | Kucharski et al. |
| 2010/0078680 A1 | 4/2010 | Cheng et al. |
| 2010/0080504 A1 | 4/2010 | Shetrit et al. |
| 2010/0128336 A1 | 5/2010 | Witzens et al. |
| 2010/0135347 A1 | 6/2010 | Deladurantaye et al. |
| 2010/0200733 A1 | 8/2010 | McLaren et al. |
| 2010/0290732 A1 | 11/2010 | Gill |
| 2010/0296768 A1 | 11/2010 | Wu et al. |
| 2010/0296812 A1* | 11/2010 | Asghari ................ B82Y 20/00 398/82 |
| 2010/0310208 A1 | 12/2010 | Wang et al. |
| 2010/0330727 A1 | 12/2010 | Hill et al. |
| 2011/0013905 A1 | 1/2011 | Wang et al. |
| 2011/0013911 A1 | 1/2011 | Alexander et al. |
| 2011/0142390 A1 | 6/2011 | Feng et al. |
| 2011/0142391 A1 | 6/2011 | Asghari et al. |
| 2011/0180795 A1 | 7/2011 | Lo et al. |
| 2011/0200333 A1 | 8/2011 | Schrenk et al. |
| 2011/0206313 A1* | 8/2011 | Dong .................... G02F 1/025 385/2 |
| 2011/0293279 A1 | 12/2011 | Lam et al. |
| 2012/0080672 A1 | 4/2012 | Rong et al. |
| 2012/0093519 A1 | 4/2012 | Lipson et al. |
| 2012/0189239 A1 | 7/2012 | Tu et al. |
| 2012/0207424 A1 | 8/2012 | Zheng et al. |
| 2012/0213531 A1 | 8/2012 | Nazarathy et al. |
| 2012/0328292 A1 | 12/2012 | Testa et al. |
| 2013/0020556 A1 | 1/2013 | Bowers |
| 2013/0051727 A1 | 2/2013 | Mizrahi et al. |
| 2013/0051798 A1 | 2/2013 | Chen et al. |
| 2013/0058606 A1 | 3/2013 | Thomson et al. |
| 2013/0089340 A1 | 4/2013 | Huang et al. |
| 2013/0094797 A1 | 4/2013 | Zheng et al. |
| 2013/0182305 A1 | 7/2013 | Feng et al. |
| 2013/0188902 A1 | 7/2013 | Gardes et al. |
| 2013/0195397 A1 | 8/2013 | Kung et al. |
| 2013/0195398 A1* | 8/2013 | Liao .................... G02B 6/1223 385/14 |
| 2013/0229701 A1* | 9/2013 | Feng .................... G02F 1/0147 359/278 |
| 2013/0259483 A1 | 10/2013 | McLaren et al. |
| 2013/0301979 A1* | 11/2013 | Qian .................... H01L 31/105 385/14 |
| 2013/0315599 A1 | 11/2013 | Lam et al. |
| 2013/0316484 A1* | 11/2013 | Fong .................... G02F 1/025 438/57 |
| 2014/0113397 A1* | 4/2014 | Qian ..................... H01L 31/18 438/57 |
| 2014/0161457 A1 | 6/2014 | Ho et al. |
| 2014/0226976 A1 | 8/2014 | Britz et al. |
| 2014/0307300 A1 | 10/2014 | Yang et al. |
| 2014/0332918 A1* | 11/2014 | Li ..................... H01L 31/02327 257/432 |
| 2014/0341497 A1 | 11/2014 | Liu et al. |
| 2014/0341498 A1 | 11/2014 | Manouvrier |
| 2015/0010307 A1 | 1/2015 | Zhong et al. |
| 2015/0071651 A1 | 3/2015 | Asmanis et al. |
| 2015/0162182 A1 | 6/2015 | Edmonds et al. |
| 2015/0293384 A1* | 10/2015 | Ogawa ................... G02F 1/015 385/2 |
| 2015/0346520 A1 | 12/2015 | Lee et al. |
| 2015/0362764 A1* | 12/2015 | Cunningham .......... G02F 1/025 385/2 |
| 2015/0373433 A1 | 12/2015 | McLaren et al. |
| 2016/0103382 A1 | 4/2016 | Liboiron-Ladouceur et al. |
| 2016/0211921 A1 | 7/2016 | Welch et al. |
| 2016/0218811 A1 | 7/2016 | Chen et al. |
| 2016/0266337 A1* | 9/2016 | Feng ...................... G02B 6/10 |
| 2016/0358954 A1 | 12/2016 | Hoyos et al. |
| 2016/0365929 A1 | 12/2016 | Nakamura et al. |
| 2017/0082876 A1 | 3/2017 | Jones et al. |
| 2017/0250758 A1 | 8/2017 | Kikuchi et al. |
| 2017/0288781 A1 | 10/2017 | Carpentier et al. |
| 2017/0299902 A1* | 10/2017 | Yu ......................... G02F 1/015 |
| 2018/0059504 A1* | 3/2018 | Mekis .................. G02F 1/2257 |
| 2018/0335569 A1 | 11/2018 | Saito et al. |
| 2018/0335653 A1 | 11/2018 | Mentovich et al. |
| 2019/0139950 A1 | 5/2019 | Yu et al. |
| 2019/0179177 A1 | 6/2019 | Rickman et al. |
| 2019/0278111 A1 | 9/2019 | Yu et al. |
| 2020/0124878 A1 | 4/2020 | Yu et al. |

FOREIGN PATENT DOCUMENTS

| | | |
|---|---|---|
| CN | 102162137 A | 8/2011 |
| CN | 102713703 A | 10/2012 |
| CN | 102955265 A | 3/2013 |
| CN | 205485142 U | 8/2016 |
| EP | 0 310 058 A2 | 4/1989 |
| EP | 1 761 103 A1 | 3/2007 |
| EP | 3 046 275 A1 | 7/2016 |
| JP | 06-232384 A | 8/1994 |
| JP | 2004-163753 A | 6/2004 |
| JP | 2005-300678 A | 10/2005 |
| WO | WO 91/13375 A1 | 9/1991 |
| WO | WO 92/10782 A1 | 6/1992 |
| WO | WO 02/41663 A2 | 5/2002 |
| WO | WO 02/086575 A1 | 10/2002 |
| WO | WO 2008/024458 A2 | 2/2008 |
| WO | WO 2009/048773 A1 | 4/2009 |
| WO | WO 2011/069225 A1 | 6/2011 |
| WO | WO 2015/060820 A1 | 4/2015 |
| WO | WO 2015/155900 A1 | 10/2015 |
| WO | WO 2016/094808 A1 | 6/2016 |
| WO | WO 2016/139484 A1 | 9/2016 |
| WO | WO 2016/154764 A2 | 10/2016 |
| WO | WO 2017/135436 A1 | 8/2017 |

OTHER PUBLICATIONS

International Search Report and Written Opinion of the International Searching Authority, dated Mar. 1, 2018, corresponding to PCT/EP2017/081215, 15 pages.

International Search Report and Written Opinion of the International Searching Authority, dated Mar. 8, 2018, corresponding to PCT/EP2017/081186, 13 pages.

U.K. Intellectual Property Office Search Report, dated May 25, 2018, for Patent Application No. GB1720033.8, 3 pages.

U.K. Intellectual Property Office Search Report, dated May 30, 2018, for Patent Application No. GB1720036.1, 7 pages.

(56) References Cited

OTHER PUBLICATIONS

U.K. Intellectual Property Office Examination Report, dated Aug. 23, 2018, for Patent Application No. GB1720033.8, 5 pages.
U.K. Intellectual Property Office Search and Examination Report, dated Aug. 28, 2018, for Patent Application No. GB1720036.1, 7 pages.
U.S. Appl. No. 16/465,535, filed May 30, 2019.
"40Gb/s 2R Optical Regenerator (wavelength converter)", CIP Technologies, Preliminary Datasheet, Nov. 2013, 2 pages.
Bregni, Stefano et al., "Architectures and Performance of AWG-Based Optical Switching Nodes for IP Networks", IEEE Journal on Selected Areas in Communications, Sep. 2003, pp. 1113-1121, vol. 21, No. 7.
Chinese Notification of the First Office Action and Search Report, for Patent Application No. 201580009961.1, dated Sep. 5, 2018, 8 pages.
Chinese Notification of the First Office Action, for Patent Application No. 201710650505.6, dated Mar. 21, 2019, 5 pages.
Chinese Patent Office Notification of the Second Office Action, for Patent Application No. 201580009961.1, dated May 13, 2019, 5 pages.
Coldren et al. "Diode Lasers and Photonic Integrated Circuits", 2012, pp. 1-12, Second Edition, John Wiley & Sons, Inc.
Dong, Po et al., "Wavelength-tunable silicon microring modulator", Optics Express, May 10, 2010, pp. 10941-10946, vol. 18, No. 11.
Dong, Po et al., "High-speed low-voltage single-drive push-pull silicon Mach-Zehnder modulators", Optics Express, Mar. 12, 2012, pp. 6163-6169, vol. 20, No. 6.
Dubé-Demers, Raphaël et al., "Low-power DAC-less PAM-4 transmitter using a cascaded microring modulator", Optics Letters, Nov. 15, 2016, pp. 5369-5372, vol. 41, No. 22, Optical Society of America.
Durhuus, Terji et al., "All-Optical Wavelength Conversion by Semiconductor Optical Amplifiers", Journal of Lightwave Technology, Jun. 1996, pp. 942-954, vol. 14, No. 6.
Edagawa, Noboru et al., "Novel Wavelength Converter Using an Electroabsorption Modulator", IEICE Trans. Electron., Aug. 1998, pp. 1251-1257, vol. E81-C, No. 8.
Ellis, A.D. et al., "Error free 100Gbit/s wavelength conversion using grating assisted cross-gain modulation in 2mm long semiconductor amplifier", Electronics Letters, Oct. 1, 1998, pp. 1958-1959, vol. 34, No. 20.
European Patent Office Communication pursuant to Article 94(3) EPC, for Patent Application No. 15 707 725.6, dated Jun. 7, 2019, 7 pages.
Farrell, Nick, "Intel pushes photonic tech for the data center", TechRadar, Apr. 2, 2014, http://www.techradar.com/news/internet/data-centre/intel-pushes-its-photonic-tech-for-the-data-centre-1239198, 6 pages.
Farrington, Nathan et al., "A Demonstration of Ultra-Low-Latency Data Center Optical Circuit Switching," ACM SIGCOMM Computer Communication Review, vol. 42, No. 4, 2012, pp. 95-96.
Farrington, Nathan et al., "Helios: A Hybrid Electrical/Optical Switch Architecture for Modular Data Centers", SIGCOMM'10, Aug. 30-Sep. 3, 2010, 12 Pages, New Delhi, India.
Fidaner, Onur et al., "Integrated photonic switches for nanosecond packet-switched optical wavelength conversion", Optics Express, Jan. 9, 2006, pp. 361-368, vol. 14, No. 1.
Fidaner, Onur et al., "Waveguide Electroabsorption Modulator on Si Employing Ge/SiGe Quantum Wells", Optical Society of America, 2007, 1 page.
Foster, Mark A., "Broad-band continuous-wave parametric wavelength conversion in silicon nanowaveguides", Optics Express, Sep. 24, 2007, pp. 12949-12958, vol. 15, No. 20.
Fu, Enjin et al., "Traveling Wave Electrode Design for Ultra Compact Carrier-injection HBT-based Electroabsorption Modulator in a 130nm BiCMOS Process", Proc. of SPIE, 2014, 11 pages, vol. 8989.

Geis, M.W. et al., "Silicon waveguide infrared photodiodes with >35 GHz bandwidth and phototransistors with 50 AW-1 response", Optics Express, Mar. 18, 2009, pp. 5193-5204, vol. 17, No. 7.
Gripp, Jürgen et al., "Optical Switch Fabrics for Ultra-High-Capacity IP Routers", Journal of Lightwave Technology, Nov. 2003, pp. 2839-2850, vol. 21, No. 11.
Hsu, A. et al., "Wavelength Conversion by Dual-Pump Four-Wave Mixing in an Integrated Laser Modulator", IEEE Photonics Technology Letters, Aug. 2003, pp. 1120-1122, vol. 15, No. 8.
Hu, Hao et al., "Ultra-high-speed wavelength conversion in a silicon photonic chip", Optics Express, Sep. 26, 2011, pp. 19886-19894, vol. 19, No. 21.
Hussain, Ashiq et al., "Optimization of Optical Wavelength Conversion in SOI Waveguide", Applied Mechanics and Materials, 2012, 5 pages, vol. 110-116.
International Search Report and Written Opinion of the International Searching Authority, dated Jun. 8, 2015, dated Jun. 15, 2015, Corresponding to PCT/GB2015/050523, 14 pages.
International Search Report and Written Opinion of the International Searching Authority, dated Jun. 8, 2015, dated Sep. 16, 2015, Corresponding to PCT/GB2015/050524, 18 pages.
International Search Report and Written Opinion of the International Searching Authority, dated Aug. 29, 2018, Corresponding to PCT/EP2018/062269, 15 pages.
International Search Report and Written Opinion of the International Searching Authority, dated Jun. 6, 2016, Corresponding to PCT/GB2016/050570, 13 pages.
International Search Report and Written Opinion of the International Searching Authority, dated Mar. 28, 2018, Corresponding to PCT/EP2017/083028, 14 pages.
International Search Report and Written Opinion of the International Searching Authority, dated Mar. 8, 2018, Corresponding to PCT/EP2017/080216, 14 pages.
International Search Report and Written Opinion of the International Searching Authority, dated Mar. 8, 2018, Corresponding to PCT/EP2017/080221, 13 pages.
International Search Report and Written Opinion of the International Searching Authority, dated May 26, 2017, Corresponding to PCT/IT2017/000004, 13 pages.
International Search Report and Written Opinion of the International Searching Authority, dated May 8, 2015 and Received May 11, 2015, Corresponding to PCT/GB2015/050520, 11 pages.
International Search Report and Written Opinion of the International Searching Authority, dated Sep. 11, 2017, Corresponding to PCT/GB2017/051998, 15 pages.
Kachris, Christoforos et al., "A Survey on Optical Interconnects for Data Centers", IEEE Communications Surveys & Tutorials, vol. 14, No. 4, Fourth Quarter 2012, pp. 1021-1036.
Kachris, Christoforos et al., "Optical Interconnection Networks in Data Centers: Recent Trends and Future Challenges", IEEE Communications Magazine, Optical Technologies for Data Center Networks, Sep. 2013, pp. 39-45.
Kimoto, Koji et al., "Metastable ultrathin crystal in thermally grown SiO2 film on Si substrate", AIP Advances, Nov. 12, 2012, pp. 042144-1 through 042144-5, vol. 2, AIP Publishing.
Knoll, Dieter et al., "BiCMOS Silicon Photonics Platform for Fabrication of High-Bandwidth Electronic-Photonic Integrated Circuits", IEEE, 2016, pp. 46-49.
Lal, Vikrant et al., "Monolithic Wavelength Converters for High-Speed Packet-Switched Optical Networks", IEEE Journal of Selected Topics in Quantum Electronics, Jan./Feb. 2007, pp. 49-57, vol. 13, No. 1.
Leuthold, J. et al., "All-optical wavelength conversion between 10 and 100 Gb/s with SOA delayed-interference configuration", Optical and Quantum Electronics, 2001, pp. 939-952, vol. 33, Nos. 7-10.
Lever, L. et al., "Adiabatic mode coupling between SiGe photonic devices and SOI waveguides", Optics Express, Dec. 31, 2012, pp. 29500-29506, vol. 20, No. 28.
Liao, Ling et al., "High speed silicon Mach-Zehnder modulator", Optics Express, Apr. 18, 2005, pp. 3129-3135, vol. 13, No. 8.
Liu, Ansheng et al., "High-speed optical modulation based on carrier depletion in a silicon waveguide", Optics Express, Jan. 22, 2007, pp. 660-668, vol. 15, No. 2.

(56) References Cited

OTHER PUBLICATIONS

Liu, Y. et al., "Error-Free 320-Gb/s All-Optical Wavelength Conversion Using a Single Semiconductor Optical Amplifier", Journal of Lightwave Technology, Jan. 2007, pp. 103-108, vol. 25, No. 1.
Maxwell, G. et al., "WDM-enabled, 40Gb/s Hybrid Integrated All-optical Regenerator", ECOC 2005 Proceedings, 2005, pp. 15-16, vol. 6.
Meuer, Christian et al., "80 Gb/s wavelength conversion using a quantum-dot semiconductor optical amplifier and optical filtering", Optics Express, Mar. 3, 2011, pp. 5134-5142, vol. 19, No. 6.
Moerman, Ingrid et al., "A Review on Fabrication Technologies for the Monolithic Integration of Tapers with III-V Semiconductor Devices", IEEE Journal of Selected Topics in Quantum Electronics, Dec. 1997, pp. 1308-1320, vol. 3, No. 6.
Nakamura, Shigeru et al., "168-Gb/s All-Optical Wavelength Conversion With a Symmetric-Mach-Zehnder-Type Switch", IEEE Photonics Technology Letters, Oct. 2001, pp. 1091-1093, vol. 13, No. 10.
Neilson, David T., "Photonics for Switching and Routing", IEEE Journal of Selected Topics in Quantum Electronics, Jul./Aug. 2006, pp. 669-678, vol. 12, No. 4.
Ngo, Hung Q. et al, "Nonblocking WDM Switches Based on Arrayed Waveguide Grating and Limited Wavelength Conversion", Proceedings from the 23rd Conference of the IEEE Communications Society, 2004, 11 pages.
Ngo, Hung Q. et al., "Constructions and Analyses of Nonblocking WDM Switches Based on Arrayed Waveguide Grating and Limited Wavelength Conversion", IEEE/ACM Transactions on Networking, Feb. 2006, pp. 205-217, vol. 14, No. 1.
Ngo, Hung Q. et al., "Optical Switching Networks with Minimum Number of Limited Range Wavelength Converters," 24th Annual Joint Conference of the IEEE Computer and Communications Societies. Proceedings IEEE vol. 2, 2005, pp. 1128-1138.
Nishimura, Kohsuke et al., "Optical wavelength conversion by electro-absorption modulators", Active and Passive Optical Components for WDM Communications IV, Proceedings of SPIE, 2004, pp. 234-243, vol. 5595.
Partial English translation of the Chinese Notification of the First Office Action and Search Report, for Patent Application No. 201580009961.1, dated Sep. 5, 2018, 12 pages.
Partial English translation of the Chinese Patent Office Notification of the Second Office Action, for Patent Application No. 201580009961. 1, dated May 13, 2019, 7 pages.
Partial English translation of the Chinese Notification of the First Office Action, for Patent Application No. 201710650505.6, dated Mar. 21, 2019, 7 pages.
Pogossian, S.P. et al., "Analysis of high-confinement SiGe/Si waveguides for silicon-based optoelectronics", J. Opt. Soc. Am. A, Mar. 1999, pp. 591-595, vol. 16, No. 3, Optical Society of America.
Proietti, Robert et al., "TONAK: A Distributed Low-latency and Scalable Optical Switch Architecture," 39th European Conference and Exhibition on Optical Communication, 2013, pp. 1005-1007.
Proietti, Roberto et al., "40 Gb/s 8x8 Low-latency Optical Switch for Data Centers," OSA/OFC/NFOEC 2011, 3 pages.
Quad 40Gb/s 2R Optical Regenerator, CIP Technologies, Preliminary Datasheet, Nov. 2013, 2 pages.
Reed, Graham T. et al., "Silicon optical modulators", Materials Today, Jan. 2005, pp. 40-50, vol. 8, No. 1.
RefractiveIndex.INFO, Refractive index database, https:// RefractiveIndex.INFO, 2015, 2 pages.
Roelkens, Gunther et al., "III-V-on-Silicon Photonic Devices for Optical Communication and Sensing", Photonics, 2015, 29 pages, vol. 2, No. 3.
Rouifed, Mohamed-Saïd et al., "Advances Toward Ge/SiGe Quantum-Well Waveguide Modulators at 1.3µm", IEEE Journal of Selected Topics in Quantum Electronics, Jul./Aug. 2014, 7 pages, vol. 20, No. 4.
RP Photonics Encyclopedia, Refractive Index, 2015, 3 pages, RP Photonics Consulting GmbH.
Segawa, Toru et al., "All-optical wavelength-routing switch with monolithically integrated filter-free tunable wavelength converters and an AWG", Optics Express, Feb. 17, 2010, pp. 4340-4345, vol. 18, No. 5.
Stamatiadis, C. et al., "Fabrication and experimental demonstration of the first 160 Gb/s hybrid silicon-on-insulator integrated all-optical wavelength converter", Optics Express, Feb. 1, 2012, pp. 3825-3831, vol. 20, No. 4.
Stamatiadis, Christos et al., "Photonic Provisioning Using a Packaged SOI Hybrid All-Optical Wavelength Converter in a Meshed Optical Network Testbed", Journal of Lightwave Technology, Sep. 15, 2012, pp. 2941-2947, vol. 30, No. 18.
Stubkjaer, Kristian E., "Semiconductor Optical Amplifier-Based All-Optical Gates for High-Speed Optical Processing", IEEE Journal on Selected Topics in Quantum Electronics, Nov./Dec. 2000, pp. 1428-1435, vol. 6, No. 6.
Summers, Joseph A. et al., "Monolithically Integrated Multi-Stage All-Optical 10Gbps Push-Pull Wavelength Converter", Optical Fiber Communication Conference, 2007, 3 pages, Anaheim, CA, USA.
Sysak, M.N. et al., "Broadband return-to-zero wavelength conversion and signal regeneration using a monolithically integrated, photocurrent-driven wavelength converter", Electronics Letters, Dec. 7, 2006, 2 pages, vol. 42, No. 25.
Tauke-Pedretti, Anna et al., "Separate Absorption and Modulation Mach-Zehnder Wavelength Converter", Journal of Lightwave Technology, 2008, pp. 1-8, vol. 26, No. 1.
Turner-Foster, Amy C. et al., "Frequency conversion over two-thirds of an octave in silicon nanowaveguides", Optics Express, Jan. 15, 2010, pp. 1904-1908, vol. 18, No. 3.
U.K. Intellectual Property Office Examination Report, dated Apr. 12, 2019, for Patent Application No. GB1703716.9, 5 pages.
U.K. Intellectual Property Office Examination Report, dated Aug. 10, 2017, for Patent Application No. GB1420064.6, 5 pages.
U.K. Intellectual Property Office Examination Report, dated Aug. 20, 2018, for Patent Application No. GB 1711525.4, 4 pages.
U.K. Intellectual Property Office Examination Report, dated Mar. 21, 2018, for Patent Application No. GB 1420064.6, 3 pages.
U.K. Intellectual Property Office Search and Examination Report, dated Apr. 20, 2017, for Patent Application No. GB 1703716.9, 7 pages.
U.K. Intellectual Property Office Search and Examination Report, dated Mar. 13, 2018, for Patent Application No. GB1800519.9, 9 pages.
U.K. Intellectual Property Office Search and Examination Report, dated Sep. 12, 2017, for Patent Application No. GB1711525.4, 5 pages.
U.K. Intellectual Property Office Search Report, dated Aug. 6, 2014, for Patent Application No. GB1403191.8, 5 pages.
U.K. Intellectual Property Office Search Report, dated Jul. 13, 2017, for Patent Application No. GB1706331.4, 3 pages.
U.K. Intellectual Property Office Search Report, dated Jun. 10, 2015, for Patent Application No. GB1420063.8, 4 pages.
U.K. Intellectual Property Office Search Report, dated Jun. 4, 2015, for Patent Application No. GB1420064.6, 5 pages.
U.K. Intellectual Property Office Search Report, dated Sep. 19, 2017, for Patent Application No. GB1704739.0, 4 pages.
U.K. Intellectual Property Office Search Report, dated Sep. 5, 2014, for Patent Application No. GB1403191.8, 2 pages.
U.K. Intellectual Property Office Examination Report, dated Dec. 2, 2015, for Patent Application No. GB 1403191.8, 3 pages.
U.K. Intellectual Property Office Examination Report, dated Oct. 20, 2015, for GB 1420063.8, 3 pages.
U.S. Office Action from U.S. Appl. No. 14/629,922 dated Nov. 25, 2015, 13 pages.
U.S. Office Action from U.S. Appl. No. 14/629,922, dated May 11, 2016, 14 pages.
U.S. Office Action from U.S. Appl. No. 15/120,861, dated Apr. 25, 2018, 15 pages.
U.S. Office Action from U.S. Appl. No. 15/120,861, dated Aug. 10, 2018, 20 pages.
U.S. Office Action from U.S. Appl. No. 15/120,861, dated Nov. 17, 2017, 22 pages.

(56) References Cited

OTHER PUBLICATIONS

U.S. Office Action from U.S. Appl. No. 15/256,321, dated Oct. 31, 2016, 24 pages.
U.S. Office Action from U.S. Appl. No. 15/369,804 dated Jul. 6, 2017, 14 pages.
U.S. Office Action from U.S. Appl. No. 15/430,314, dated Jan. 29, 2018, 26 pages.
U.S. Office Action from U.S. Appl. No. 15/555,431, dated Apr. 6, 2018, 11 pages.
U.S. Office Action from U.S. Appl. No. 15/927,943, dated Jun. 15, 2018, 13 pages.
U.S. Office Action from U.S. Appl. No. 16/195,774, dated Aug. 20, 2019, 38 pages.
U.S. Office Action from U.S. Appl. No. 16/195,774, dated Apr. 20, 2020, 41 pages.
U.S. Office Action from U.S. Appl. No. 16/195,774, dated Oct. 9, 2020, 30 pages.
U.S. Office Action from U.S. Appl. No. 16/231,257, dated Oct. 24, 2019, 8 pages.
U.S. Office Action from U.S. Appl. No. 16/275,157, dated Sep. 6, 2019, 13 pages.
U.S. Office Action from U.S. Appl. No. 16/275,157, dated Feb. 21, 2020, 14 pages.
U.S. Office Action from U.S. Appl. No. 16/420,096, dated Jan. 17, 2020, 11 pages.
U.S. Office Action from U.S. Appl. No. 16/420,096, dated Jul. 28, 2020, 10 pages.
U.S. Office Action from U.S. Appl. No. 16/550,141, dated Jul. 16, 2020, 12 pages.
Vivien, L. et al., "High speed silicon modulators and detectors", ACP Technical Digest, Communications and Photonics Conference, Nov. 7, 2012, 3 pages.
Vivien, Laurent et al., "High speed and high responsivity germanium photodetector integrated in a Silicon-On-Insulator microwaveguide", Optics Express, Jul. 23, 2007, pp. 9843-9848, vol. 15, No. 15.
Vlachos, Kyriakos et al., "Photonics in switching: enabling technologies and subsystem design", Journal of Optical Networking, May 2009, pp. 404-428, vol. 8, No. 5.
Wang, J. et al., "Evanescent-Coupled Ge p-i-n. Photodetectors on Si-Waveguide With SEG-Ge and Comparative Study of Lateral and Vertical p-i-n. Configurations", IEEE Electron Device Letters, May 2008, pp. 445-448, vol. 29, No. 5.
Website: "Cladding (fiber optics)", Wikipedia, 2012, http://en.wikipedia.org/w/index.php?title=Cladding_(fiber_optics)&oldid=508909143, 1 page.
Website: "Epitaxy", Wikipedia, 2015, https://en.wikipedia.org/w/index.php?title=Epitaxy&oldid=686946039, 6 pages.
Website: "Intel primes market for silicon photonics to lift data centre interconnect speeds", The Inquirer, http://www.theinquirer.net/inquirer/news/234 5 61 O/intel-primes-market-for -silicon-photonics-to-lift-data-centre-interconnect-speeds, printed Jan. 18, 2017, 8 pages.
Website: "Silicon dioxide", Wikipedia, 2013, http://web.archive.org/web/20130423194808/https://en.wikipedia.org/wiki/Silicon_dioxide, printed Aug. 14, 2019, 13 pages.
Website: "Silicon on insulator", Wikipedia, 2015, https://en.wikipedia.org/w/index.php?title=Silicon_on_insulator&oldid=670386829, 5 pages.
Xi, Kang et al., "Petabit Optical Switch for Data Center Networks," Polytechnic Institute of New York University, Brooklyn, New York, 9 pages, 2010.
Yao, Shun et al., "A Unified Study of Contention-Resolution Schemes in Optical Packet-Switched Networks", Journal of Lightwave Technology, 2003, 31 pages, vol. 21, No. 3.
Ye, Tong et al., "A Study of Modular AWGs for Large-Scale Optical Switching Systems," Journal of Lightwave Technology, vol. 30, No. 13, Jul. 1, 2012, pp. 2125-2133.
Ye, Tong et al., "AWG-based Non-blocking Clos Networks", Aug. 21, 2013, pp. 1-13.

* cited by examiner and optimum to have the minimum series R

WAVEGUIDE DEVICE AND METHOD OF DOPING A WAVEGUIDE DEVICE

CROSS-REFERENCE TO RELATED APPLICATION(S)

This application is a national stage entry, under 35 U.S.C. § 371, of International Application Number PCT/EP2017/081215, filed on Dec. 1, 2017, which claims priority to and the benefit of U.S. Provisional Patent Application No. 62/429,703, filed Dec. 2, 2016. The entire contents of all of the applications identified in this paragraph are incorporated herein by reference.

FIELD

One or more aspects of embodiments according to the present invention relate to a waveguide device, and more particularly to a waveguide device comprising a rib waveguide active region, such active region functioning as a modulation or photodiode region, the rib waveguide active region having a first doped slab region at a first side of a ridge and a second doped slab region at a second side of the ridge; the doped slab regions located at small distances from the ridge.

BACKGROUND

The ability of silicon photonics to provide highly functional optical chips has long been recognized. Silicon photonics platforms support passive and active devices. However, the speed of active device such as modulators and photodiodes often reaches the limits of capability of the silicon active devices. There is thus a demand for faster active devices and devices that consume less power. One of the constraints on improvements in performance of photonic devices is the limit to accuracy of fabrication, particularly to the accuracy of the positioning and concentration of dopants.

Doped devices such as electro-absorption modulators (EAMs) and photodetectors form an important part of the development in silicon photonics and generally rely on lithographic techniques for fabrication, particularly in relation to doped regions. However, in the race to produce ever faster optical devices and components there is a need to fabricate using increasingly small dimensions. This can only be achieved if the accuracy of techniques such as area doping can be improved. As the dimensional limits of lithographic techniques are reached, there exists a need to provide improvements in the fabrication methods of optical components with smaller dimensions.

SUMMARY

According to a first aspect of the present invention, there is provided a waveguide device comprising a rib waveguide region, the rib waveguide region having: a base, and a ridge extending from the base, wherein: the base includes a first slab region at a first side of the ridge and a second slab region at a second side of the ridge; a first doped slab region that extends along the first slab region; a second doped slab region that extends along the second slab region; a first doped sidewall region that extends along a first sidewall of the ridge and along a portion of the first slab, the first doped sidewall region being in contact with the first doped slab region at a first slab interface; and a second doped sidewall region that extends along a second sidewall of the ridge and along a portion of the second slab, the second doped sidewall region being in contact with the second doped slab region at a second slab interface; and wherein the separation between the first sidewall of the ridge and the first slab interface is no more than 10 µm; and wherein the separation between the second sidewall of the ridge and the second slab interface is no more than 10 µm. In some embodiments, the separation between the first sidewall of the ridge and the first slab interface is no more than 5 µm; and the separation between the second sidewall of the ridge and the second slab interface is no more than 5 µm. The rib waveguide region may be a rib waveguide modulation region. By rib waveguide, it may be meant that an optical mode of the waveguide device is chiefly confined to the ridge. The term 'rib' may be used interchangeably with 'ridge'.

In this way, dimensions can be achieved which are close to or smaller than the lower limits of lithographic techniques. This is highly desirable in active waveguide devices such as an electro absorption waveguide modulator (EAM), photodetector (PD), electro optical phase modulators (EOM) and electro optical switches including Mach Zehnder interferometer (MZI) switches. For example, for EAMs is established that the performance (especially the speed) of the device improves as the product of the capacitance and the resistance of the fabricated device ($C_j \cdot R_j$) gets smaller. The capacitance C is reduced significantly as the sidewall doping concentration can be engineered to increase effective intrinsic region width. Series resistance is reduced since the highly doped region can be deeply doped by multiple implantations with different energies without affecting the junction capacitance. Hence the product $C_j \cdot R_S$ can be reduced significantly, by at least one order of magnitude compared with previous implementations.

In some embodiments, the waveguide device further comprises a first electrical contact located on the first doped slab region and a second electrical contact located on the second doped region; wherein the separation distance between the first electrical contact and the first sidewall of the ridge is no more than 10 µm; and wherein the separation between the second electrical contact and the second sidewall of the ridge is no more than 10 µm.

In some embodiments, the separation distance between the first electrical contact and the first sidewall of the ridge is no more than 5 µm; and the separation between the second electrical contact and the second sidewall of the ridge is no more than 5 µm.

According to a second aspect of the present invention, there is provided a method of fabricating a waveguide device comprising:

providing a rib waveguide, the rib waveguide comprising: a base, and a ridge extending from the base; wherein: the base includes a first slab region at a first side of the ridge and a second slab region at a second side of the ridge; and creating a first doped slab region which extends along the first slab region; the step of creating the first doped slab region comprising:

providing a photoresist over at least a portion of the second slab region, the photoresist extending further from the base than the ridge extends from the base;

implanting the first slab region with a dopant at an angle α to the first sidewall of the waveguide, using the photoresist as a mask to cast a shadow over regions not to be doped including the second sidewall of the ridge.

In this way, the limitations of conventional lithographic doping techniques which do not allow devices with such small components to be made, especially not in high yields, are overcome.

According to a third aspect of the present invention, there is provided a waveguide device comprising a rib waveguide region, the waveguide device being fabricated by the method of the second aspect.

Further optional features are set out below:

In some embodiments, the method of fabricating a waveguide device further comprises the step of: implanting a first sidewall of the ridge and a portion of the first slab region with the dopant, at an angle β to the first sidewall of the ridge, to create a first doped sidewall region which extends along a first sidewall of the ridge and along a portion of the first slab, the first doped sidewall region being in contact with the first doped slab region at a first slab interface.

In some embodiments, the separation between the first sidewall of the ridge and the first slab interface is no more than 10 μm.

In some embodiments, the separation between the first sidewall of the ridge and the first slab interface is no more than 5 μm.

In some embodiments, the dopant for doping the first slab region and the first sidewall region is an n-type dopant.

In some embodiments, the dopant of the first slab is the same material as the dopant of the first sidewall region.

In some embodiments, the method of fabricating the waveguide device further comprises the steps of:

removing the photoresist from over the second slab region;

creating a first doped slab region which extends along the first slab region; the step of creating the first doped slab region comprising:

providing a photoresist over at least a portion of the first slab region, the photoresist extending further from the base than the ridge extends from the base;

implanting the second slab region with a second dopant at an angle α to the second sidewall of the waveguide, using the photoresist as a mask to cast a shadow over regions not to be doped, including the first sidewall of the ridge.

In some embodiments, the method of doping a waveguide device further comprises the step of: implanting a second sidewall of the ridge and a portion of the second slab region with the dopant, at an angle β to the second sidewall of the ridge, to create a second doped sidewall region which extends along a second sidewall of the ridge and along a portion of the second slab, the second doped sidewall region being in contact with the second doped slab region at a second slab interface.

In some embodiments, the separation between the second sidewall of the ridge and the second slab interface is no more than 10 μm. Advantageously, in some embodiments, the separation between the second sidewall of the ridge and the second slab interface is no more than 5 μm.

In some embodiments, the dopant for doping the first slab region and the first sidewall region is an N-type dopant. The N-type dopant of the first slab doped region may be the same material as the dopant of the second sidewall region.

Typically, the first doped slab region has a higher concentration of dopant (N++) than the first doped sidewall (N) and the second doped slab region has a higher concentration of dopant (P++) than the second doped sidewall (P). Examples of suitable P type dopants include: boron, BF2, and phosphorus. An example of a suitable N type dopant is arsenic. The concentration ranges for the slab doped regions (typically heavily doped), for both N and P type regions, is 1e18-1e21 [1/cm$^3$]. For sidewall doping (typically lower dopant concentrations as compared to slab doping) a typical concentration range is 1e15-1e20 [1/cm$^3$]. For sidewalls, the more lightly doped, the better, to get as wide an intrinsic region as possible. This reduces the capacitance and increases the RC time constant which can be a key bandwidth driver. The aim is to increase the gain bandwidth of the device as much as possible.

In some embodiments, where a photoresist thickness of 5.6 μm or more is used, the implant angle α angle has a value of 17.7 degrees or greater.

In some embodiments, the device further comprises a regrown or epitaxial crystalline cladding layer located between the base of the waveguide device and a silicon substrate. In some embodiments, the device may further comprise a buried oxide layer, disposed on opposing horizontal sides of the epitaxial crystalline layer, and wherein the epitaxial crystalline cladding layer is formed of a material which is different from the buried oxide layer. By horizontal, a direction may be meant which is perpendicular to the direction in which the ridge extends. The epitaxial crystalline cladding layer may be formed of a material which is not buried oxide. The epitaxial crystalline cladding layer may be formed, for example, of silicon (Si) or silicon germanium (SiGe).

By using the method described herein, it is possible to improve device performance since series resistance is decoupled from junction capacitance. Using previous methods, the achievable series R is typically more than 60 ohm while capacitance of the junction is more than 50 fF. Using proposed method, it is possible to achieve sub 10 ohm series resistance and a junction capacitance more than 30 fF. This means factor of 10× improvement in the RC time constant. While this means device high speed behavior is not limited to RC time constant and it is transit time limited (the maximum achievable bandwidth), at the same time it also improves other aspects of device operation like higher linearity (increasing optical saturation power), improved high-speed operation at high optical powers, higher extinction ratio, ER, at higher optical power.

BRIEF DESCRIPTION OF THE DRAWINGS

These and other features and advantages of the present invention will be appreciated and understood with reference to the specification, claims, and appended drawings wherein:

DETAILED DESCRIPTION

Figure 1:
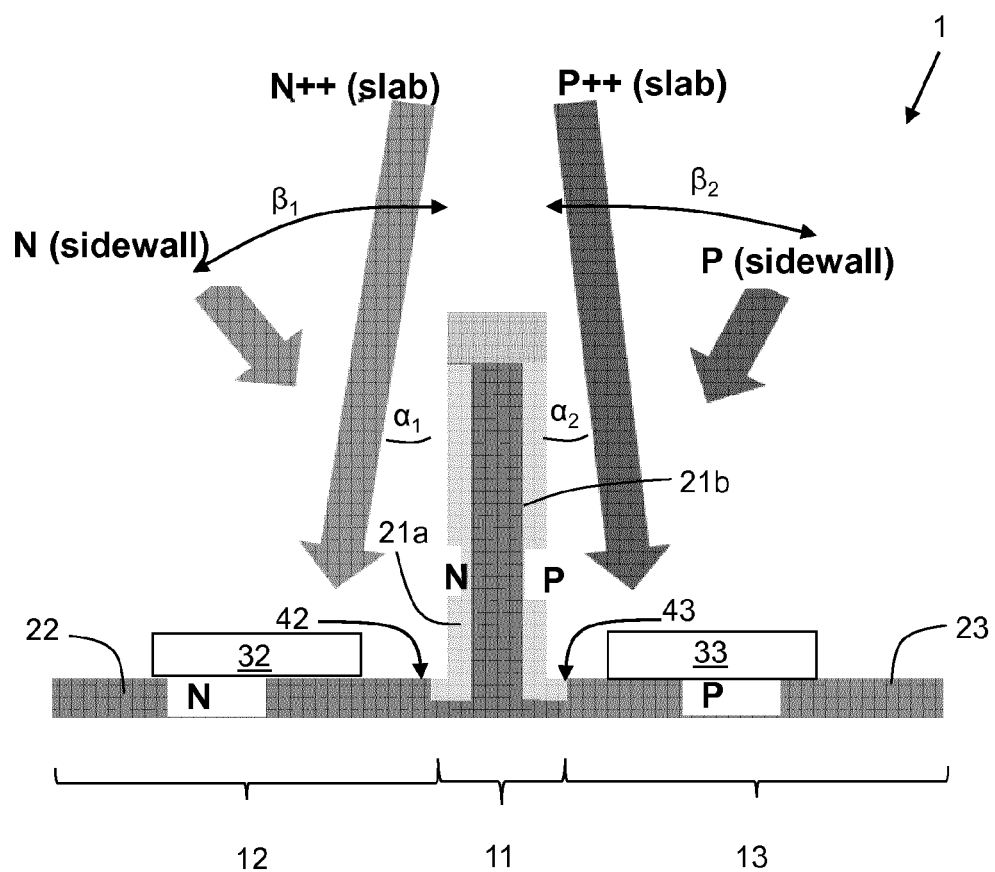
FIG. 1 depicts a schematic diagram of a waveguide device and method of fabricating the waveguide device according to the present invention.

The detailed description set forth below in connection with the appended drawings is intended as a description of exemplary embodiments of an active waveguide device and a method of fabrication of a waveguide device provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A waveguide device and method of fabricating the device is described below in relation to FIG. 1. Initially the basic active waveguide structure is formed as an upstanding waveguide fabricated on a silicon platform, for example a silicon on insulator (SOI) platform using standard techniques, the structure including a waveguide, the waveguide comprising: a base, and a ridge 11 extending from the base. The base includes a first slab region 12 at a first side of the ridge and a second slab region 13 at a second side of the ridge 11. The ridge 11 includes a first sidewall and a second sidewall.

The basic active waveguide structure may comprise materials such as silicon germanium (in particular, for example when the waveguide device is an optical modulator) or germanium (in particular, for example, when the waveguide device is a photodiode). The techniques for fabrication of such waveguide structures are known and will not be described here in more detail. Instead, this application focusses on the novel doping structures and techniques which form part of the fabrication of the final device, whether that be a modulator, a photodiode, or another waveguide-based device. A first doped slab region 22 is created which extends along the first slab region 12; the step of creating the first doped slab region comprising: providing a photoresist (not shown in FIG. 1) over at least a portion of the second slab region 13, the photoresist extending further upwards (i.e. further in a direction parallel to that in which the sidewalls of the ridge extend) from the base than the ridge extends from the base and then implanting the first slab region 12 with a dopant N++ at an angle $\alpha_1$ to the first sidewall of the waveguide, and thereby using the photoresist as a mask to cast a shadow over regions not to be doped including the second sidewall 21b of the ridge. Importantly, the lateral distance covered by the shadow on the first slab dictates where the slab doped region 22 will terminate (i.e. the position of a first slab interface). For fast devices, the goal is to get the first slab interface as close to the first sidewall as possible. For example, a separation of no more than 10 µm is desirable and a separation of no more than 5 µm is even more desirable.

In a separate doping step, a first sidewall of the ridge and a portion of the first slab region is implanted with a dopant at an angle $\beta_1$ to the first sidewall of the ridge, to create a first doped sidewall region 21a which extends along a first sidewall of the ridge and along a portion of the first slab, the first doped sidewall region 21a therefore contacting the first doped slab region physically and electrically at a first slab interface 42 which is laterally offset in a first direction from the first sidewall of the ridge. The fabrication process is repeated on the second side of the waveguide, starting initially with the step of removing the photoresist from over the second slab region 13 and instead providing a photoresist over at least a portion of the first slab region 22, the photoresist extending further from the base than the ridge extends from the base. A second doped slab region 23 which extends along the first slab region can then be created using the shadow doping method by implanting the second slab region with a second dopant at an angle $\alpha_2$ to the second sidewall of the waveguide, using the photoresist (not shown) as a mask to cast a shadow over regions of the second slab and second sidewall of the ridge that are not to be doped.

In a final doping step, the second sidewall of the ridge and a portion of the second slab region is doped by implanting them with a dopant at an angle $\beta_2$ to the second sidewall of the ridge, to create a second doped sidewall region 21b which extends along a second sidewall of the ridge and along a portion of the second slab, the second doped sidewall region being in contact physically and electrically with the second doped slab region 23 at a second slab interface 43 which is laterally offset in a second direction from the second sidewall of the ridge.

A first electrical contact 32, typically a metal layer, is located on top of the first doped slab region 22 in electrical contact with the first doped slab region and a second electrical contact 33, typically a metal layer, is located on top of and in electrical contact with the second doped slab region. In this way, an electrical bias applied between the two electrical contacts 32, 33 will provide a corresponding bias across the waveguide. For optimal working speeds of the device, it is desirable to locate the electrical contacts as close to the waveguides as possible. Again, a separation of no more than 10 µm is desirable and a separation of no more than 5 µm is even more desirable.

Where the electro optical waveguide device takes the form of an electro absorption modulator (EAM), the waveguide is formed of an electro-absorption material. By applying a bias across the first and second contacts, an electrical field is generated in the electro-absorption material in which the Franz Keldysh effect occurs, the presence of an electrical field thereby giving rise to an increase in the absorption of light within the electro-absorption material.

Where the electro optical waveguide device is a photodiode, the ridge will comprise an optically active material. Upon application of a reverse bias across the first and second contacts, an electrical field will be created between the doped regions. Absorption of light within the waveguide will cause a change in the electrical current between the contacts 32, 33, the magnitude of which indicates the intensity of the light detected.

Figure 2:
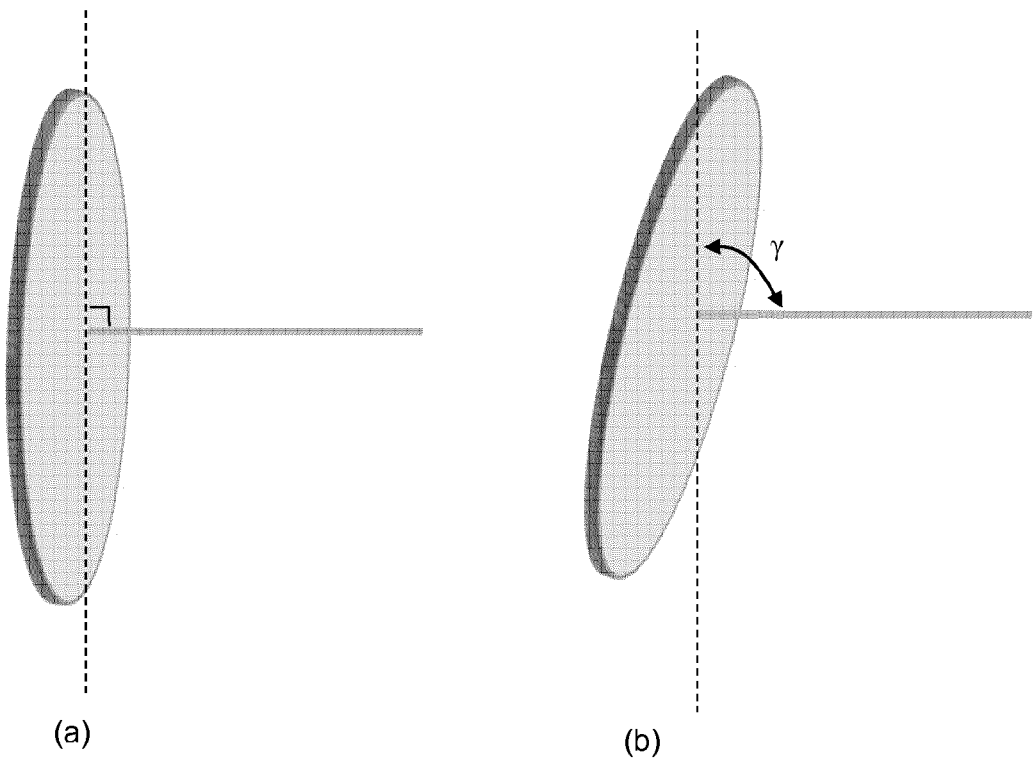
FIG. 2 depicts a schematic diagram of a semiconductor wafer bearing the regions to be doped being rotated to expose the surface at the correct angel for doping.

FIG. 2 shows examples in which a wafer can be placed relative to the angle at which the ion beam of the dopant is applied. In this way, the angle of the wafer itself during the dopant process facilitates the shadow doping procedure. In the first example (a), the wafer is angled so that its face is orthogonal (i.e. at 90 degrees or substantially 90 degrees) to the ion beam of dopant. In other words, no tilt is applied to the wafer. In the second example (b), a tilt is applied to the wafer so that the face of the wafer is at a non-orthogonal (or substantially non-orthogonal) angle to the ion beam. For example, a wafer tilt of 30 degrees may be applied, in which case, the smallest angle γ between the face of the wafer and the ion beam would be 60 degrees or substantially 60 degrees. Clearly, for the embodiment depicted in FIG. 1, during the deposition of the dopant for the first slab doped region and the second doped region, the smallest angle γ between the face of the wafer and the ion beam will have an angle of α1, or α2 respectively.

Suitable dopants could include phosphorus for N-type doping and boron for P-type doping.

By utilizing the methods described above, particularly the shadow masking layer or layers, it is possible to create a shadow precise enough produce a highly doped region very close to the active waveguide. If such high doping were to extend into the waveguide region, the device would not perform as required. Neither would it perform as effectively if the doping were too far from the waveguide. The ability to tilt accurately the face of the wafer at an angle γ to direction of a doping beam further facilitates the control of the angle and in combination with the shadow doping, therefore creates an improved method by which a highly doped region can be applied in close proximity to the waveguide.

The shadow doping mechanism is explained in more detail below with reference to FIGS. 3a, 3b and 3c. The embodiment described in relation to FIGS. 3a, 3b and 3c show one example of suitable dimensions that would result in a desirable sub-Sum measurement between the doped slab region and the adjacent sidewall of the ridge.

Figure 3A:
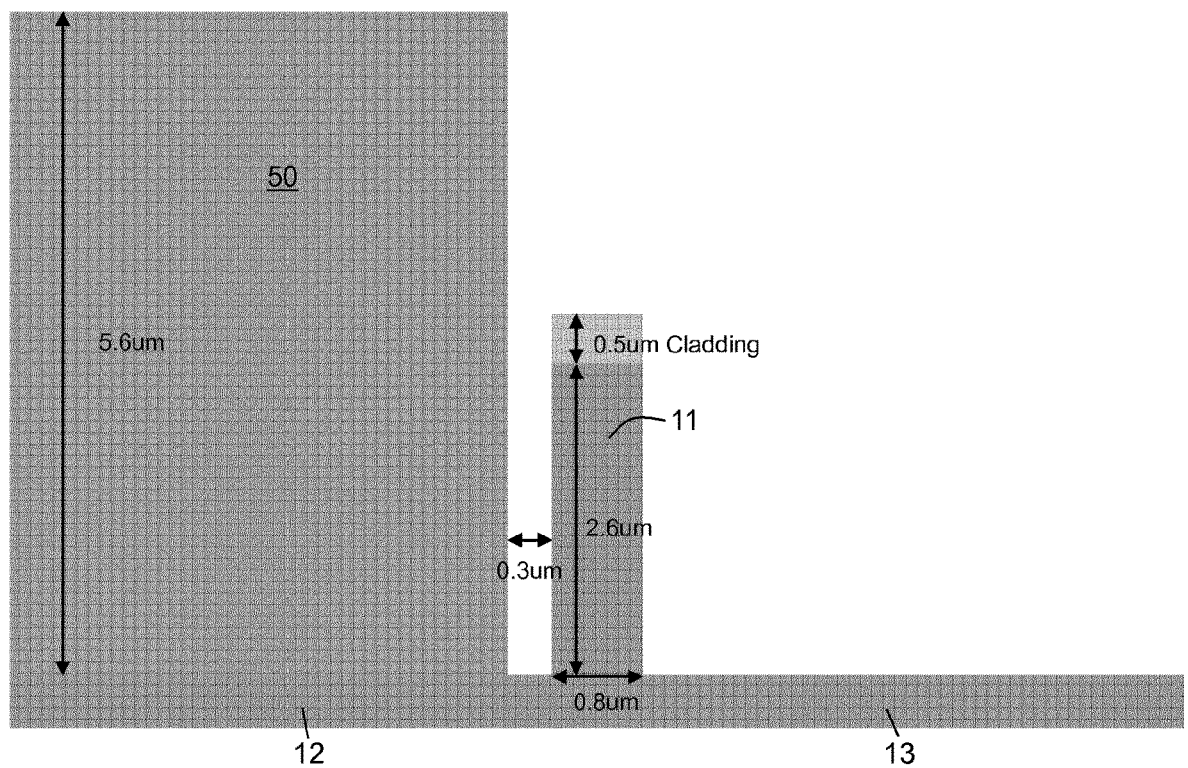
FIGS. 3a, 3b and 3c illustrate examples of the photoresist applied during the fabrication process to enable shadow doping of the waveguide device.

FIG. 3a shows an example of desirable dimensions for a particular instance of doping of the second slab 13. In this example, a photoresist mask is applied over the first slab 12, leaving a clearance distance of 0.3 μm between the photoresist and the first sidewall of the ridge. The photoresist has a height which is greater than that of the ridge. In the embodiment shown, a layer of cladding is applied to the top of the ridge, in this example with a thickness of 0.5 μm. The height of the photoresist is therefore chosen so that it is greater than the sum of the ridge and the cladding layer. In the embodiment shown, the ridge has a height of 2.6 μm and a thickness of 0.8 μm, and the photoresist mask 50 applied has a height of 5.6 μm.

Figure 3B:
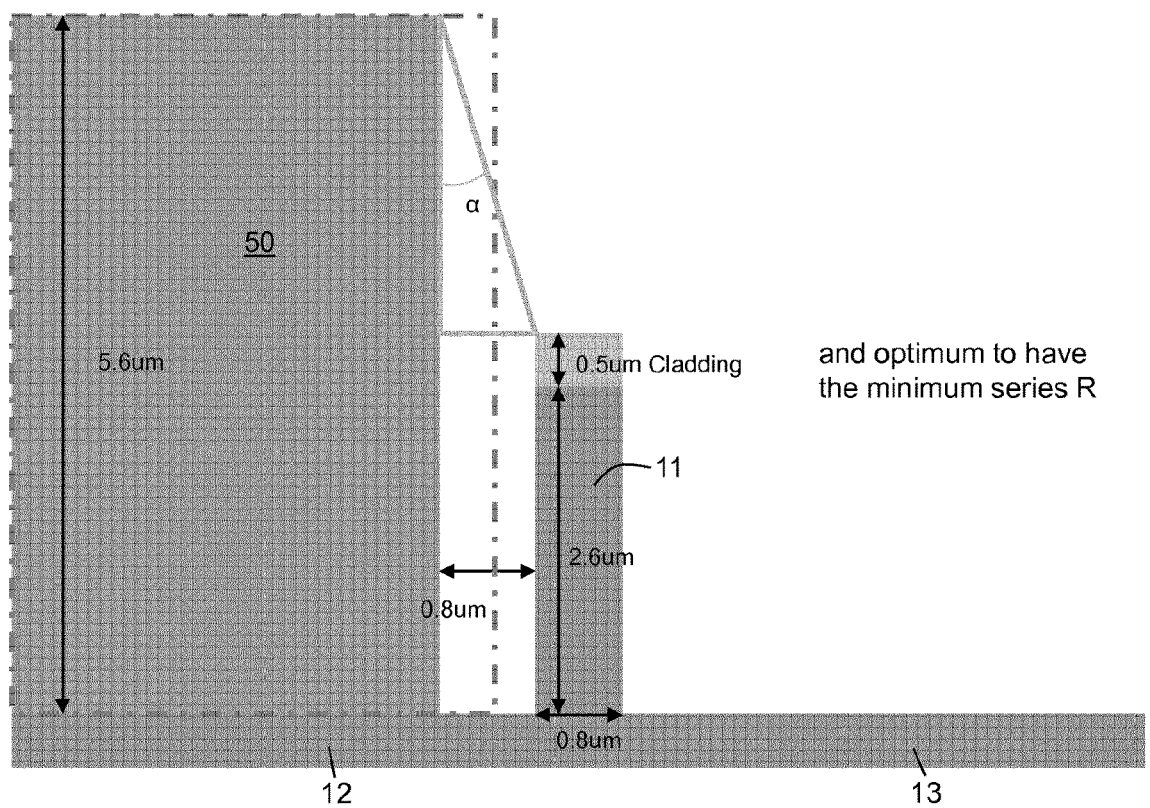
Figure 3C:
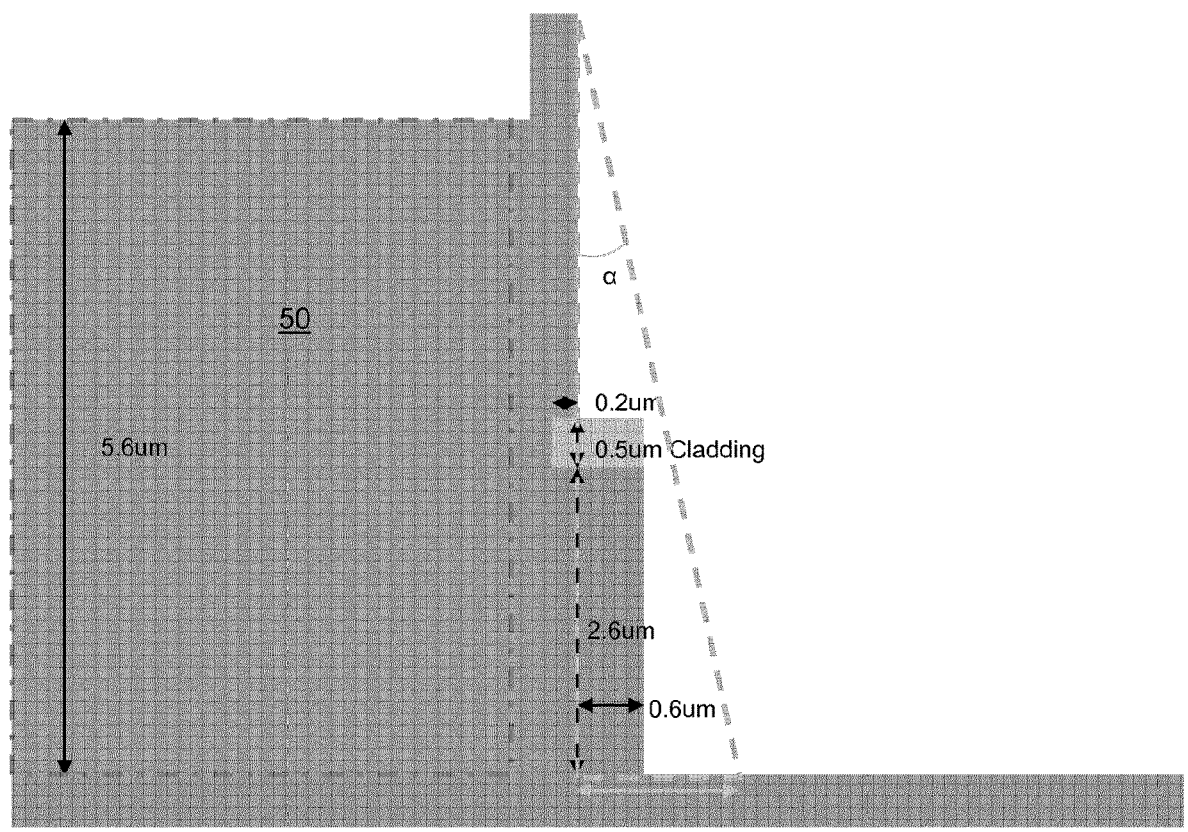

FIGS. 3b and 3c depict the tolerance and design considerations that must be taken when determining the optimum angle α at which the ion dopant beam should be set in order to ensure that the opposite sidewall (in this case the first sidewall) lies entirely within the shadow of the photoresist mask but that the doped region of the slab (in this case the second slab) lies as close as possible to the second sidewall of the ridge, thereby reducing the series resistance R of the device as much as possible.

The minimum value for the implant angle α of FIG. 3a which ensures that it does not dope the first sidewall can be calculated by the following equation:

$$\tan \alpha = \text{maximum separation}/(\text{height of photoresist} - \text{height of ridge}) \quad (1.1)$$

where the height of the ridge includes the thickness of any cladding layer if a cladding layer is present.

For the example dimensions depicted in FIG. 3b, this gives the following minimum implant angle:

$$\tan(\alpha) = \frac{0.8 \text{ um}}{5.6 \text{ um} - (2.6 \text{ um} + 0.5 \text{ um})} \quad (1.2)$$

$$\alpha = 17.7° \quad (1.3)$$

The calculation has assumed a 0.5 μm error in the separation distance between the first sidewall and the photoresist mask. For the calculation of the smallest possible angle α, the maximum possible separation for this example is used (i.e. 0.3 μm+0.5 μm=0.8 μm).

FIG. 3c illustrates the other extreme within the tolerance of the system (i.e. that the photoresist ends up deposited 5 μm in the other direction). In this case, there is no separation between the photoresist and the first sidewall. Some of the photoresist is deposited on top of the ridge. Using equation 1.1 above, it is therefore possible to calculate the worst case scenario in terms of the minimum separation between the doped (second) slab and the second sidewall that can be achieved when doping at the minimum implant angle. Using the dimensions of FIG. 3c, and the angle calculated in 1.3 above, this gives:

$$\tan(17.7°) = \frac{x}{5.6 \text{ um} + (2.6 \text{ um} + 0.5 \text{ um})} \quad (1.4)$$

Note that it is assumed that the resist which is located on top of the cladding on the ridge will have a thickness corresponding to the height of the photoresist on the first slab (in this case 5.6 μm).

$$x = 2.78 \text{ um} \quad (1.5)$$

So, for the dimensions shown in FIG. 3c, an implantation angle of 17.7 degrees will lead to a worst case scenario of 2.78 μm for the separation between the second sidewall and the second doped slab region.

Doping is achieved in a standard implanter with capability to tilt and rotate the substrate holder. For a given dopant the "dose" of dopant received by the regions of semiconductor to be doped depends upon the energy of the ion beam and the time of exposure.

The slab doped regions (typically heavily doped) and sidewall doped regions (typically lightly doped) may use different dopants. That is to say, it would be possible to have 2 different P dopants and 2 different N dopants. One example of a benefit provided by different dopants could be the ability to more easily obtain different depths of penetration that may be required for performance optimization.

Figure 4:
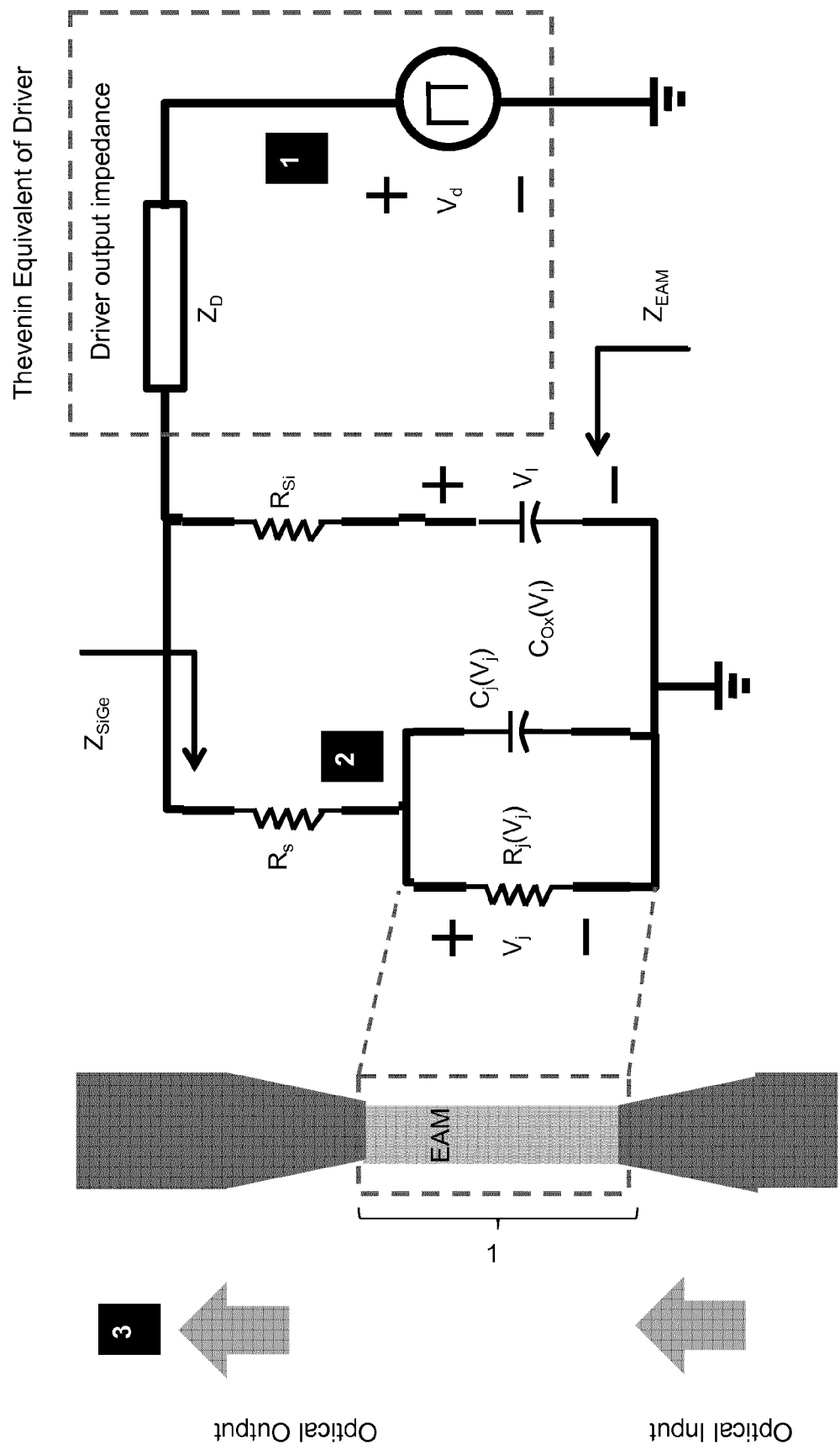
FIG. 4 shows a representative circuit for a waveguide device according to the present invention, the waveguide device taking the form of an electro absorption modulator.

FIG. 4 shows the representative circuit of a waveguide EA modulator where the EAM modulator shown is a top view and the fabrication of the device corresponds to that of the waveguide device 1 shown in FIG. 1. A bias $V_j$ is applied across the contacts 32, 33, giving rise to a resulting capacitance and Resistance $R_s$.

It is established that the performance (especially speed) of the device improves as $C_j \cdot R_5$ gets smaller. The capacitance C is reduced significantly as the sidewall doping concentration can be engineered to increase effective intrinsic region width. Series resistance is reduced since the highly doped region can be deeply doped by multiple implantations with different energies without affecting the junction capacitance. Hence the product $C_j \cdot R_5$ can be reduced significantly.

The embodiment of FIG. 4 shows an example of a large signal lumped circuit model of an EAM.

Figure 5:
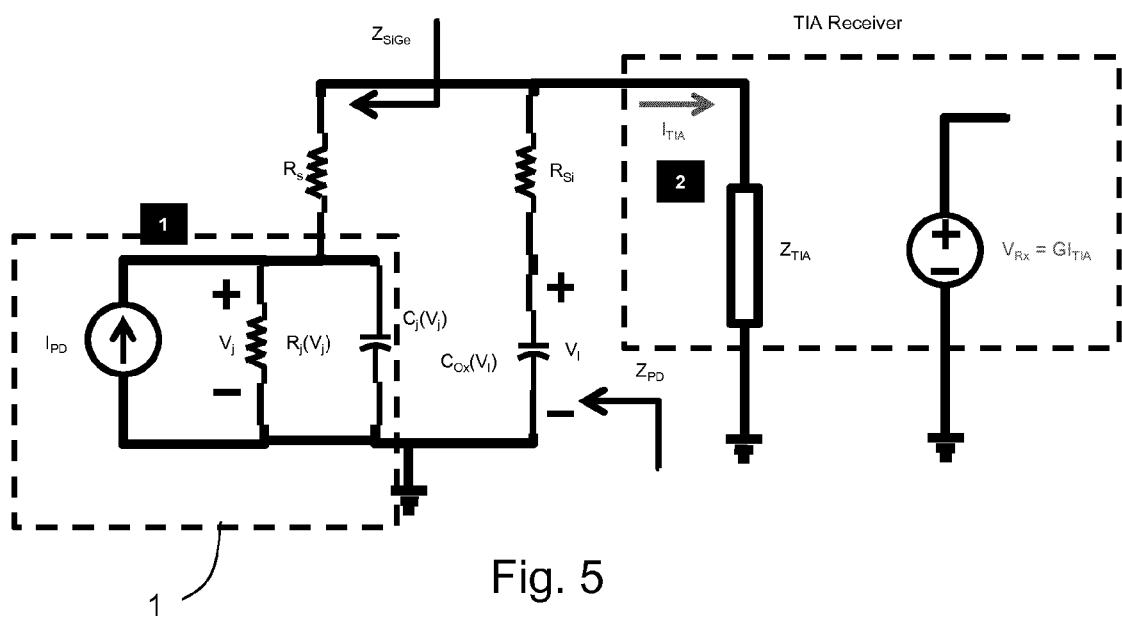
FIG. 5 shows a representative circuit for a waveguide device of the present invention, the waveguide device taking the form of a waveguide photodiode.

FIG. 5 shows the representative circuit of a waveguide photodiode modulator where the fabrication of the photodiode will again correspond to that of the waveguide device 1 shown in FIG. 1. In this case, a current $I_{PD}$ is generated by putting optical power inside photodiode waveguide for a given reverse bias Vj across the contacts 32, 33. As with the modulator example, the device, in use, will therefore have an inherent capacitance Cj and Resistance $R_s$. Again, the performance of the device improves as $C_j \cdot R_s$ gets smaller.

Figure 6:
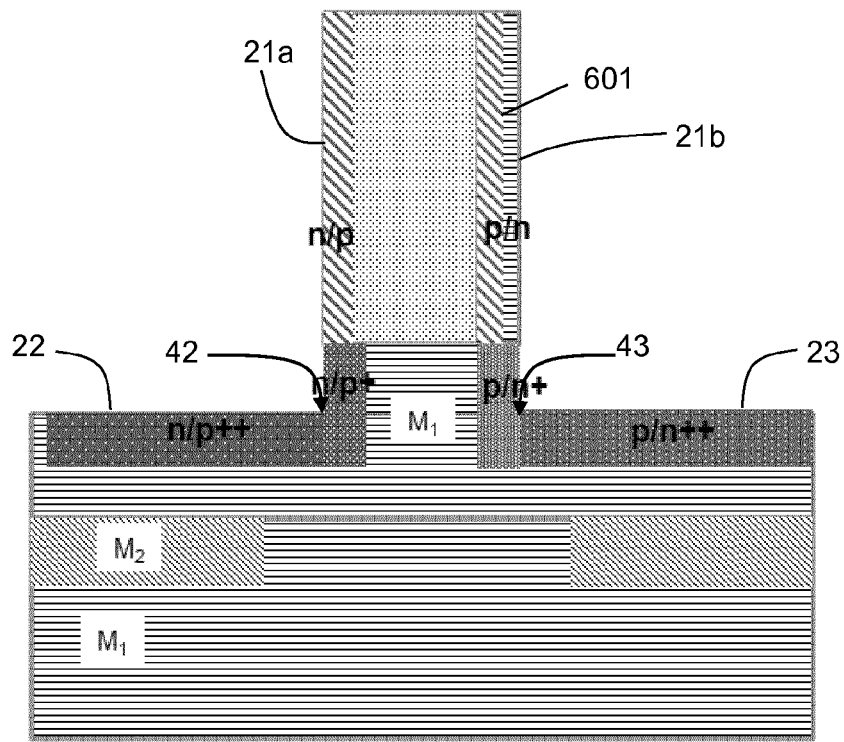
FIG. 6 shows a schematic diagram of a variant waveguide device.
Figure 7:
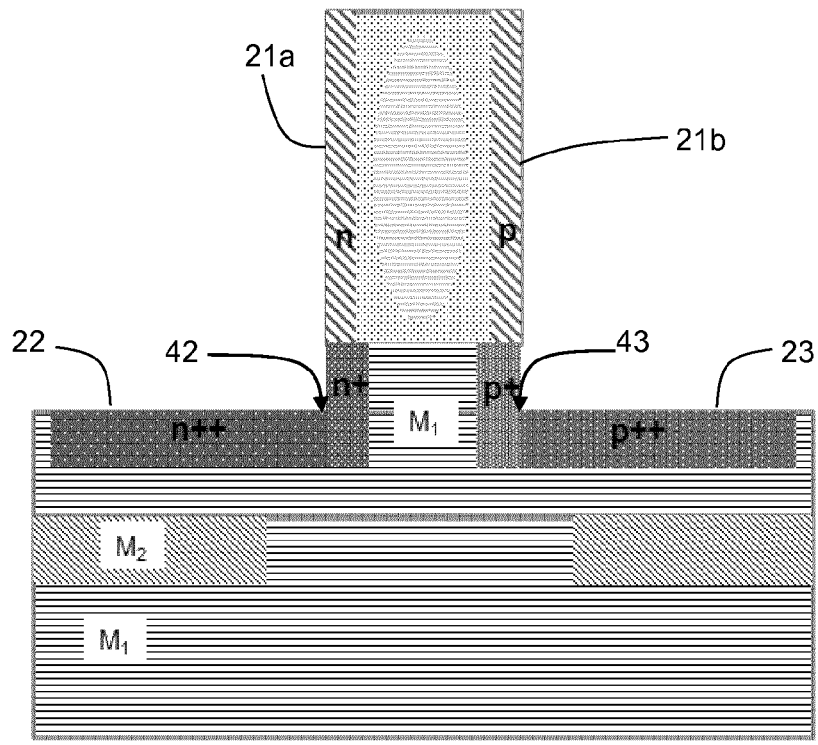
FIG. 7 shows a schematic diagram of a further variant waveguide device.

As will be appreciated, the method of fabrication described above can be used to fabricate many variants of electro-absorption modulator or photodetector. For example: proud waveguide, single silicon sidewall, and 'BOX-less' devices i.e. those with a epitaxial crystalline layer. FIGS. 6 and 7 show examples of these devices made using the same method of fabrication described above and can generally be referred to as proud waveguide devices. In the devices shown there is no buried oxide below the ridge of the waveguide, instead there may be a regrown or epitaxial crystalline cladding layer. The slab and a portion of the ridge is formed of a first material $M_1$, and a region beneath the first slab region and the second slab region is formed of a second material $M_2$. The second material $M_2$ may be buried oxide (BOX) e.g. silicon oxide. The remaining part of the ridge not formed of material $M_1$ may be formed of a different material e.g. Si or SiGe. Of course, in other examples, buried oxide may be present below the ridge such that the second material $M_2$ forms a substantially continuous layer. In FIG. 6, at least one sidewall 601 of the ridge is formed of doped silicon. Generally the sidewall doping concentration is smaller than the slab doping. This can be achieved by separating the implantation processes. The structures shown are similar to those disclosed in U.S. 62/429,701, the entire contents of which is incorporated herein by reference.

Although exemplary embodiments of an active waveguide device have been specifically described and illustrated herein, many modifications and variations will be apparent to those skilled in the art. Accordingly, it is to be understood that an active waveguide device constructed according to principles of this invention may be embodied other than as specifically described herein. The invention is also defined in the following claims, and equivalents thereof.

What is claimed is:

1. A waveguide device comprising a rib waveguide region, the rib waveguide region having:
    a base; and
    a ridge extending from the base, wherein the base includes a first slab region at a first side of the ridge and a second slab region at a second side of the ridge;
    a first doped slab region that extends along the first slab region;
    a second doped slab region that extends along the second slab region;
    a first doped sidewall region that extends along a first sidewall of the ridge and along a portion of the first slab region, the first doped sidewall region having a different doping concentration than the first doped slab region and being in contact with the first doped slab region at a first slab interface; and
    a second doped sidewall region that extends along a second sidewall of the ridge and along a portion of the second slab region, the second doped sidewall region having a different doping concentration than the second doped slab region and being in contact with the second doped slab region at a second slab interface,
    wherein a separation between the first sidewall of the ridge and the first slab interface is no more than 10 µm, and
    wherein a separation between the second sidewall of the ridge and the second slab interface is no more than 10 µm.

2. The waveguide device of claim 1, wherein the separation between the first sidewall of the ridge and the first slab interface is no more than 5 µm; and
    wherein the separation between the second sidewall of the ridge and the second slab interface is no more than 5 µm.

3. The waveguide device of claim 1, further comprising a first electrical contact located on the first doped slab region and a second electrical contact located on the second doped slab region;
    wherein the separation between the first electrical contact and the first sidewall of the ridge is no more than 10 µm; and
    wherein the separation between the second electrical contact and the second sidewall of the ridge is no more than 10 µm.

4. The waveguide device of claim 3,
    wherein the separation between the first electrical contact and the first sidewall of the ridge is no more than 5 µm; and
    wherein the separation between the second electrical contact and the second sidewall of the ridge is no more than 5 µm.

5. A method of fabricating the waveguide device of claim 1, the method comprising:
    providing a rib waveguide, the rib waveguide comprising:
        the base, and
        the ridge extending from the base;
        wherein the base includes the first slab region at the first side of the ridge and the second slab region at the second side of the ridge; and
    creating the first doped slab region which extends along the first slab region,
    the step of creating the first doped slab region comprising:
        providing a photoresist over at least a portion of the second slab region, the photoresist extending further from the base than the ridge extends from the base; and
        implanting the first slab region with a first dopant at an angle $\alpha_1$ to the first sidewall of the ridge, using the photoresist as a mask to cast a shadow over regions not to be doped including the second sidewall of the ridge.

6. The method of fabricating a waveguide device according to claim 5, further comprising the step of:
    implanting the first sidewall of the ridge and the portion of the first slab region with a second dopant, at an angle $\alpha_1$ to the first sidewall of the ridge, to create the first doped sidewall region which extends along the first sidewall of the ridge and along the portion of the first slab region, the first doped sidewall region being in contact with the first doped slab region at the first slab interface.

7. The method of fabricating a waveguide device according to claim 6, wherein the separation between the first sidewall of the ridge and the first slab interface is no more than 10 µm.

8. The method of fabricating a waveguide device according to claim 7, wherein the separation between the first sidewall of the ridge and the first slab interface is no more than 5 µm.

9. The method of fabricating a waveguide device according to claim 6, wherein the first dopant is an N-type dopant and the second dopant is an N-type dopant.

10. The method of fabricating a waveguide device according to claim 9, wherein the first dopant is the same material as the second dopant.

11. The method of fabricating a waveguide device according to claim 5, further comprising the steps of:
    removing the photoresist from over the second slab region; and
    creating the second doped slab region which extends along the second slab region, the step of creating the second doped slab region comprising:
        providing a photoresist over at least a portion of the first slab region, the photoresist extending further from the base than the ridge extends from the base; and
        implanting the second slab region with a third dopant at an angle $\alpha_2$ to the second sidewall of the ridge, using the photoresist as a mask to cast a shadow over regions not to be doped, including the first sidewall of the ridge, wherein $\alpha_2$ equals $\alpha_1$.

12. The method of fabricating a waveguide device according to claim 11, further comprising the step of:
implanting the second sidewall of the ridge and the portion of the second slab region with a fourth dopant, at an angle $\beta_2$ to the second sidewall of the ridge, to create the second doped sidewall region which extends along the second sidewall of the ridge and along the portion of the second slab region, the second doped sidewall region being in contact with the second doped slab region at the second slab interface, wherein $\beta_2$ equals $\beta_1$.

13. The method of fabricating a waveguide device according to claim 12, wherein the separation between the second sidewall of the ridge and the second slab interface is no more than 10 µm.

14. The method of fabricating a waveguide device according to claim 13, wherein the separation between the second sidewall of the ridge and the second slab interface is no more than 5 µm.

15. The method of fabricating a waveguide device according to claim 12, wherein the third dopant is a P-type dopant and the fourth dopant is a P-type dopant.

16. The method of fabricating a waveguide device according to claim 15, wherein the third dopant is the same material as the fourth dopant.

17. The method of fabricating a waveguide device according to claim 11, wherein the waveguide device is fabricated on a silicon wafer and wherein the step of implanting the second slab region with the third dopant at an angle $\alpha_2$ to the second sidewall includes the step of tilting the silicon wafer relative to a direction of implantation.

18. The method of fabricating a waveguide device according to claim 5, wherein the waveguide device is fabricated on a silicon wafer and wherein the step of implanting the first slab region with the first dopant at an angle $\alpha_1$ to the first sidewall includes the step of tilting the silicon wafer relative to a direction of implantation.

19. A waveguide device comprising a rib waveguide region, the rib waveguide region having:
a base;
a ridge extending from the base, wherein the base includes a first slab region at a first side of the ridge and a second slab region at a second side of the ridge;
a first doped slab region that extends along the first slab region;
a second doped slab region that extends along the second slab region;
a first doped sidewall region that extends along a first sidewall of the ridge and along a portion of the first slab region, the first doped sidewall region being in contact with the first doped slab region at a first slab interface;
a second doped sidewall region that extends along a second sidewall of the ridge and along a portion of the second slab region, the second doped sidewall region being in contact with the second doped slab region at a second slab interface;
an epitaxial crystalline cladding layer located between the base of the waveguide device and a silicon substrate; and
a buried oxide layer, disposed on opposing horizontal sides of the epitaxial crystalline cladding layer,
wherein a separation between the first sidewall of the ridge and the first slab interface is no more than 10 µm,
wherein a separation between the second sidewall of the ridge and the second slab interface is no more than 10 µm, and
wherein the epitaxial crystalline cladding layer is formed of a material which is different from the buried oxide layer.

20. A waveguide device comprising a rib waveguide region, the rib waveguide region having:
a base formed of a first material; and
a ridge extending from the base and including a first ridge part formed of the first material and a second ridge part formed of a second material different from the first material, wherein the base includes a first slab region at a first side of the ridge and a second slab region at a second side of the ridge;
a first doped slab region that extends along the first slab region;
a second doped slab region that extends along the second slab region;
a first doped sidewall region that extends along a first sidewall of the ridge and along a portion of the first slab region, the first doped sidewall region being in contact with the first doped slab region at a first slab interface, the first doped sidewall region including a first part at the first ridge part and a second part at the second ridge part and having a different doping concentration than the first part of the first doped sidewall region; and
a second doped sidewall region that extends along a second sidewall of the ridge and along a portion of the second slab region, the second doped sidewall region being in contact with the second doped slab region at a second slab interface, the second doped sidewall region including a first part at the first ridge part and a second part at the second ridge part and having a different doping concentration than the first part of the second doped sidewall region,
wherein a separation between the first sidewall of the ridge and the first slab interface is no more than 10 µm, and
wherein a separation between the second sidewall of the ridge and the second slab interface is no more than 10 µm.

* * * * *